(12) United States Patent
Garde et al.

(10) Patent No.: US 10,775,504 B2
(45) Date of Patent: Sep. 15, 2020

(54) LASER AIR DATA SENSOR MOUNTING AND OPERATION FOR EYE SAFETY

(71) Applicant: Honeywell International Inc., Morris Plains, NJ (US)

(72) Inventors: Jason Garde, Anthem, AZ (US); Grant Lodden, Minnetrista, MN (US); Xiao Zhu Fan, Plymouth, MN (US); Danny Thomas Kimmel, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 717 days.

(21) Appl. No.: 15/280,847

(22) Filed: Sep. 29, 2016

(65) Prior Publication Data

US 2018/0088238 A1 Mar. 29, 2018

(51) Int. Cl.
*G01S 17/58* (2006.01)
*G01S 7/481* (2006.01)
(Continued)

(52) U.S. Cl.
CPC .............. *G01S 17/58* (2013.01); *B64D 43/00* (2013.01); *G01P 5/26* (2013.01); *G01S 7/4811* (2013.01);
(Continued)

(58) Field of Classification Search
CPC .......... G01S 17/58; G01S 17/88; G01S 17/95; G01S 7/4811; G01S 7/4813; Y02A 90/19; B64D 43/02; B64D 43/00; G01P 5/26
See application file for complete search history.

(56) References Cited

U.S. PATENT DOCUMENTS 4,585,341 A * 4/1986 Woodfield .............. G01S 17/58
356/28.5
5,724,125 A 3/1998 Ames
(Continued)

FOREIGN PATENT DOCUMENTS

DE 19910667 9/2000
DE 20313276 11/2004
(Continued)

OTHER PUBLICATIONS

European Patent Office, "Extended European Search Report for EP Application No. 17191995.4", "from Foreign Counterpart to U.S. Appl. No. 15/280,847", dated Nov. 27, 2017, pp. 1-11, Published in: E.P.

(Continued)

*Primary Examiner* — Eric L Bolda
(74) *Attorney, Agent, or Firm* — Fogg & Powers LLC

(57) ABSTRACT

In one embodiment, a system includes a vehicle and a laser air data sensor, including a laser transceiver configured to transmit one or more laser light beams, mounted to the vehicle. In some embodiments, a window of the laser transceiver is fixed and oriented to transmit one or more laser light beams away from the vehicle and approximately parallel to a vertical axis of the vehicle. In some embodiments, a window of the laser transceiver is fixed and oriented to transmit one or more laser light beams toward another portion of the vehicle. In some embodiments, the system further includes a processing device configured to control the laser air data sensor to attenuate the one or more laser light beams based on one or more operating parameters of the vehicle.

19 Claims, 11 Drawing Sheets

(51) Int. Cl.
   G01S 17/95    (2006.01)
   B64D 43/00    (2006.01)
   G01P 5/26     (2006.01)
   G01S 17/88    (2006.01)
(52) U.S. Cl.
   CPC ............ *G01S 7/4813* (2013.01); *G01S 17/88* (2013.01); *G01S 17/95* (2013.01); *Y02A 90/19* (2018.01)

(56) References Cited

U.S. PATENT DOCUMENTS

| | | | |
|---|---|---|---|
| 6,091,335 | A | 7/2000 | Breda et al. |
| 6,542,831 | B1 | 4/2003 | Moosmuller et al. |
| 6,785,032 | B1 | 8/2004 | Le Mere |
| 6,856,919 | B1 | 2/2005 | Bastian et al. |
| 7,460,247 | B1 | 12/2008 | Ackerman |
| 7,847,235 | B2 | 12/2010 | Krupkin et al. |
| 7,854,505 | B2 | 12/2010 | Cunningham et al. |
| 8,434,358 | B2 | 5/2013 | Asahara et al. |
| 8,467,037 | B2 | 6/2013 | Perrie et al. |
| 9,013,332 | B2 | 4/2015 | Meis |
| 9,086,488 | B2 | 7/2015 | Tchoryk, Jr. et al. |
| 9,097,799 | B2 | 8/2015 | Inokuchi |
| 9,334,807 | B2 | 5/2016 | deGaribody |
| 9,341,642 | B1 | 5/2016 | Smith |
| 9,428,186 | B2 | 8/2016 | Breed |
| 2003/0219252 | A1 | 11/2003 | Hays |
| 2007/0097350 | A1* | 5/2007 | Halama .................. G01S 7/4811 356/4.07 |
| 2008/0048101 | A1* | 2/2008 | Romig ...................... B60J 3/04 250/221 |
| 2008/0230653 | A1 | 9/2008 | Mitchell et al. |
| 2009/0152391 | A1 | 6/2009 | McWhirk |
| 2009/0273770 | A1 | 11/2009 | Bauhahn et al. |
| 2010/0020170 | A1 | 1/2010 | Higgins-Luthman et al. |
| 2011/0035149 | A1 | 2/2011 | McAndrew et al. |
| 2011/0043785 | A1 | 2/2011 | Cates et al. |
| 2011/0141471 | A1 | 6/2011 | Schlotterbeck et al. |
| 2011/0149363 | A1 | 6/2011 | Harris et al. |
| 2012/0089362 | A1 | 4/2012 | Mandle |
| 2012/0242974 | A1 | 9/2012 | LaValley et al. |
| 2013/0240672 | A1 | 9/2013 | Meis |
| 2014/0330459 | A1 | 11/2014 | Baumgardner et al. |
| 2015/0168439 | A1 | 6/2015 | Genevrier et al. |
| 2015/0280820 | A1 | 10/2015 | Breuer et al. |
| 2015/0330310 | A1 | 11/2015 | deGaribody |
| 2016/0305977 | A1* | 10/2016 | Genevrier ............. G01P 13/025 |
| 2018/0057184 | A1* | 3/2018 | Jackowski ............. B64D 31/06 |
| 2018/0068498 | A1* | 3/2018 | Hodge ................... B64D 45/00 |
| 2018/0099740 | A1* | 4/2018 | Provost .................. B64C 13/16 |

FOREIGN PATENT DOCUMENTS

| | | |
|---|---|---|
| EP | 1783513 | 5/2007 |
| EP | 2076826 B1 | 11/2012 |
| JP | 2003156330 | 5/2003 |
| KR | 100898617 | 11/2008 |
| KR | 100898617 | 5/2009 |
| WO | 2014132074 A2 | 9/2014 |

OTHER PUBLICATIONS

Cao, Xiaodong et al, "Particle Image Velocimetry Measurement of Indoor Airflow Field: A Review of the Technologies and Applications", "Energy and Buildings", Feb. 1, 2014, pp. 367-380, vol. 69, Published in: CN.

European Patent Office, "Partial European Search Report for EP Application No. 17191993.9", "Foreign Counterpart to U.S. Appl. No. 15/427,087", dated Jan. 19, 2018, pp. 1-16, Published in: EP.

Garde et al, "Apparatus and Method for Laser Particle Sensor Eye Safety", "U.S. Appl. No. 15/427,087, filed Feb. 8, 2017", Feb. 8, 2017, pp. 1-47, Published in: US.

United States Patent and Trademark Office, "Restriction Requirement for U.S. Appl. No. 15/427,087", dated Jan. 30, 2018, pp. 1-7, Published in: US.

Bucina, "Dimmable Glass for Eye Safety for Lidar Technology", "U.S. Appl. No. 15/885,584, filed Jan. 31, 2018", Jan. 31, 2018, pp. 1-26, Published in: US.

U.S. Patent and Trademark Office, "Final Office Action", U.S. Appl. No. 15/427,087, dated Jul. 23, 2019, pp. 1-25, Published: US.

"ALTACAS", "Retrieved May 18, 2016 from http://www.altacas.com/altacas.html", , pp. 1, Publisher: ALTACAS Technology.

"NESLIE:NEw Standby Lidar InstrumEnt", "Retrieved May 18, 2016 from http://oc.europa.eu/research/transport/projects/items/neslie_en.htm", , pp. 1-5, Publisher: European Commission.

"Airborne LIDAR Survey Systems and Aviation Safety: an overview of concepts, qualifications and regulations", "prepared for Federal Aviation Administration by The Management Association for Private Photogrammetric Surveyors (MAPPS)", May 20, 2014, pp. 1-15.

Verbeek et al., "Optical Air Data System Flight Testing", "The Avionics Europe 2012 Conference, Mar. 21-22, 2012", , pp. i-26, Publisher: Nationaal Lucht—en Ruimtevaartlaboratorium, Published in: Munich, Germany.

"Windsceptor Optical Air Data Sensor Suite", "Retrieved May 19, 2016 from http://midia.wix.com/ugd/d4c014_53d61c72deeb4c6f875cfca0c57a5b45.pdf", Jul. 11, 2014, pp. 1-4, Publisher: Optical Air Data Systems.

European Patent Office, "Office Action from EP Application No. 17191995.4", "from Foreign Counterpart to U.S. Appl. No. 15/280,847" dated Jul. 19, 2018, pp. 1-4, Published in: EP.

J.A. Overbeck et al., "Airborne Lidar System Profiles Wind Fields", "http://www.laserfocusworld.com/articles/print/volume-32/issue-4/world-news/airborne-lidar-system-profiles-wind-fields.html [Nov. 9, 2017]", Jan. 4, 1996, pp. 1-10, Publisher: Laser Focus World.

European Patent Office, "Communication pursuant to Article 94(3) from EP Application No. 17191993.9 dated Dec. 21, 2018", from Foreign Counterpart to U.S. Appl. No. 15/427,087, pp. 1-12, Published: EP.

Scherbarth et al., "Eye safe Laser based DIRCM Systems", Technologies for Optical Countermeasures VI, 2009, pp. 1-10, SPIE.

U.S. Patent and Trademark Office, "Office Action", U.S. Appl. No. 15/885,584, dated Apr. 18, 2019, pp. 1-35, Published: US.

Untied States Patent and Trademark Office, "Non-Final Office Action from U.S. Appl. No. 15/427,087 dated Sep. 18, 2018", pp. 1-57, Published in: US.

European Patent Office, "Extended European Search Report for EP Application No. 17191993.9", Foreign Counterpart to U.S. Appl. No. 15/427,087 dated Mar. 29, 2018, pp. 1-15, Published in: EP.

United States Patent and Trademark Office, "Restriction Requirement for U.S. Appl. No. 15/427,087", dated Apr. 11, 2018, pp. 1-20, Published in: US.

U.S. Patent and Trademark Office, "Final Office Action", U.S. Appl. No. 15/885,584, dated Aug. 12, 2019, pp. 1-20, Published: US.

European Patent Office, "Extended European Search Report from EP Application No. 19154333.9 dated Jul. 3, 2019", from Foreign Counterpart to U.S. Appl. No. 15/885,584, pp. 1-8, Published: EP.

U.S. Patent and Trademark Office, "Advisory Action", U.S. Appl. No. 15/427,087, dated Sep. 30, 2019, pp. 1-9, Published: US.

U.S. Patent and Trademark Office, "Notice of Allowance", U.S. Appl. No. 15/885,584, dated Oct. 24, 2019, pp. 1-16, Published: US.

European Patent Office, "Communication pursuant to Article 94(3) EPC from EP Application No. 17191993.9", from Foreign Counterpart to U.S. Appl. No. 15/427,087, dated Mar. 13, 2020, pp. 1-8, Published: EP.

* cited by examiner

LASER AIR DATA SENSOR MOUNTING AND OPERATION FOR EYE SAFETY

BACKGROUND

Laser based sensing is an attractive sensor technology that could replace or augment legacy sensors on aircraft and other vehicles. Laser based sensing can be used in a variety of aerospace applications and have the potential to replace traditional air data probes (e.g., Pitot tube, Pitot-static tube, angle of attack vane, etc.). Laser based air data sensors provide a significant advantage over traditional air data probes in that laser based data sensors can sample a volume of air that is farther away from the influence of the aircraft. Laser based air data sensors also provide more flexibility for mounting locations over traditional air data probes without sacrificing the accuracy of air data parameters calculated using measurements from laser based air data sensors. Further, laser based air data sensors have reduced susceptibility to damage, icing, and other in-flight hazards compared to traditional air data probes.

However, due to the long distance capability of laser based sensors and the use of laser light beams, laser based sensors can pose a potential safety concern for operators, maintenance personnel, or citizens by exposing them to optical energies exceeding the prescribed maximum permissible exposure levels. This is particularly the case for implementations of laser based sensors that use molecular backscatter ("soft return" laser based sensor) due to the intensity and wavelength of the laser light beams for such implementations. In order to be certified for use on aircraft or other vehicles, it must be shown that these eye safety concerns are addressed before laser based air data sensors are approved for use.

For the reasons stated above and for other reasons stated below which will become apparent to those skilled in the art upon reading and understanding the specification, there is a need in the art for laser based sensor mounting configurations and operation that address eye safety requirements.

SUMMARY

The embodiments of the present disclosure provide systems and methods of operation for a laser air data sensor on a vehicle that can be used to address eye safety requirements and will be understood by reading and studying the following specification.

In some embodiments, a system includes a vehicle and a laser air data sensor mounted to a first portion of the vehicle, wherein the laser air data sensor includes a laser transceiver configured to transmit one or more laser light beams and collection optics. A window of the laser transceiver is fixed and oriented to transmit the one or more laser light beams away from the vehicle and approximately parallel to a vertical axis of the vehicle.

In some embodiments, a system includes a vehicle and a laser air data sensor mounted to a first portion of the vehicle, wherein the laser air data sensor includes a laser transceiver configured to transmit one or more laser light beams. A window of the laser transceiver is fixed and oriented to transmit the one or more laser light beams toward a second portion of the vehicle. The laser air data sensor is configured to measure an undisturbed airflow in a selected measurement region, wherein the selected measurement region is positioned between the window of the laser transceiver and the second portion of the vehicle.

In some embodiments, a system includes a vehicle and a laser air data sensor mounted to a first portion of the vehicle, wherein the laser air data sensor includes a laser transceiver configured to transmit one or more laser light beams. The system further includes at least one processing device coupled to a memory, wherein the at least one processing device is configured to control the laser air data sensor to attenuate the one or more laser light beams based on one or more operating parameters of the vehicle.

DRAWINGS

Understanding that the drawings depict only exemplary embodiments and are not therefore to be considered limiting in scope, the exemplary embodiments will be described with additional specificity and detail through the use of the accompanying drawings, in which.

Figure 3:
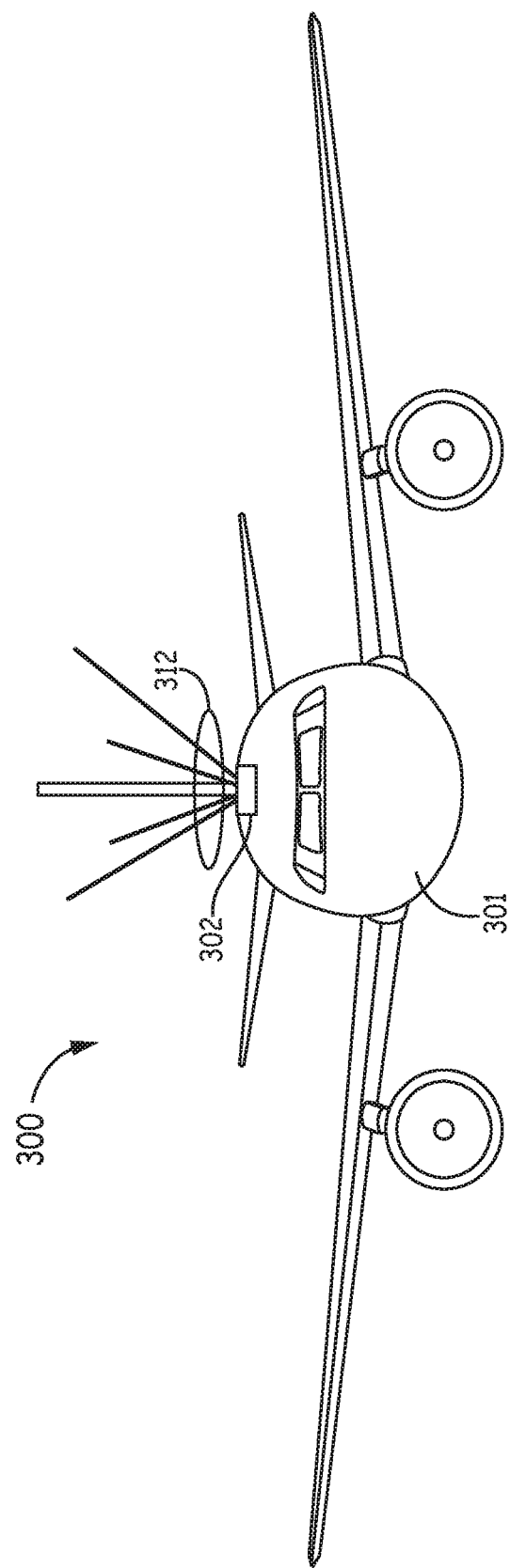
Figure 4:
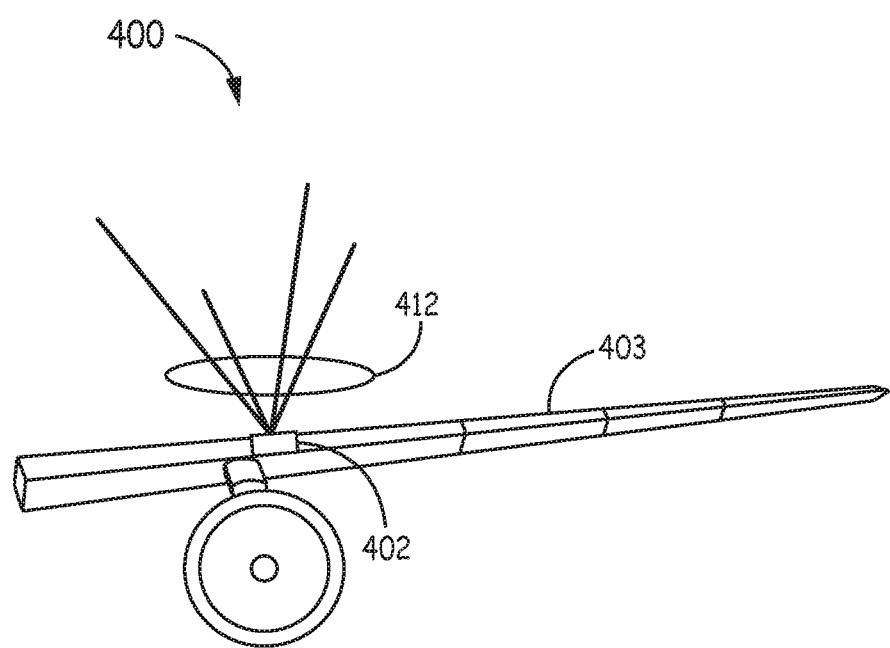
Figure 5:
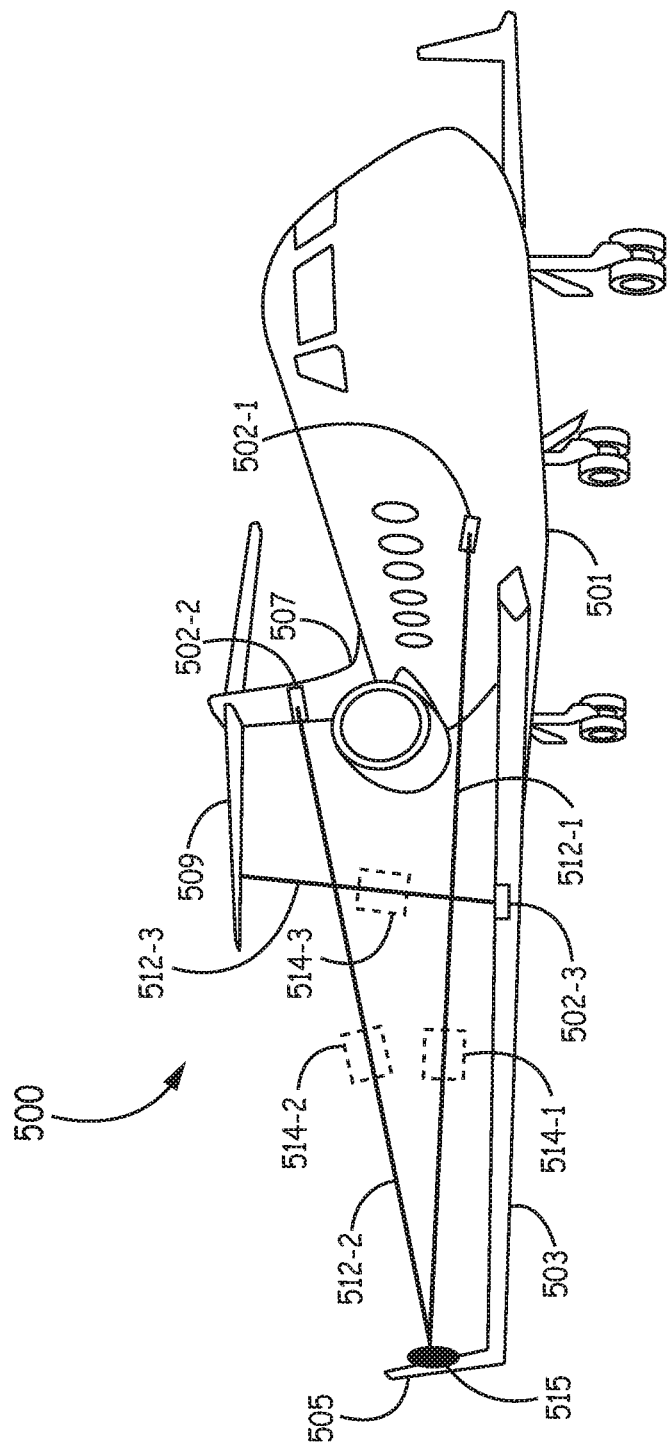
Figure 6:
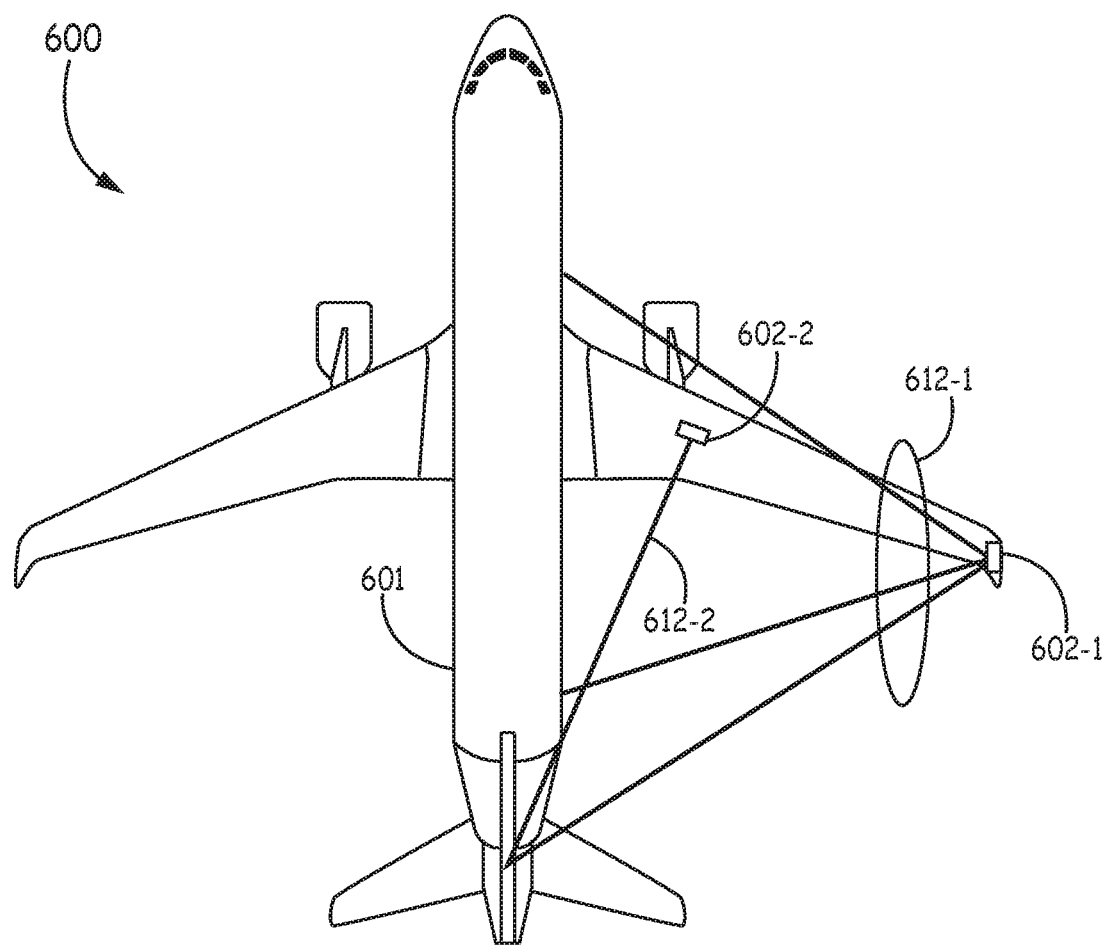
Figure 7:
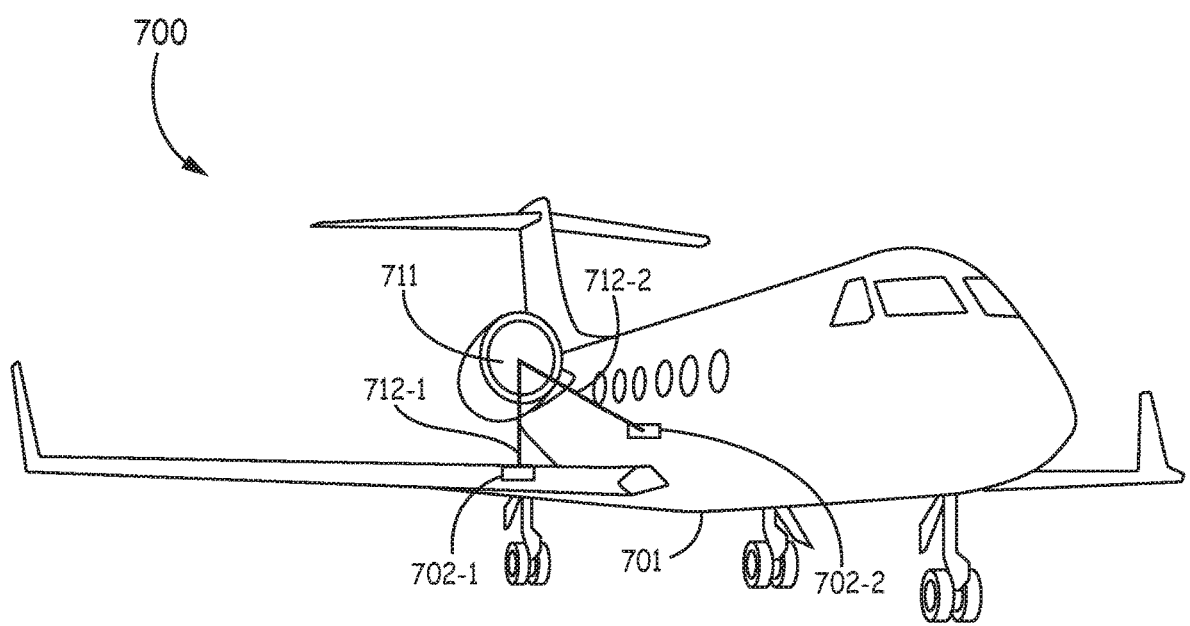
Figure 8:
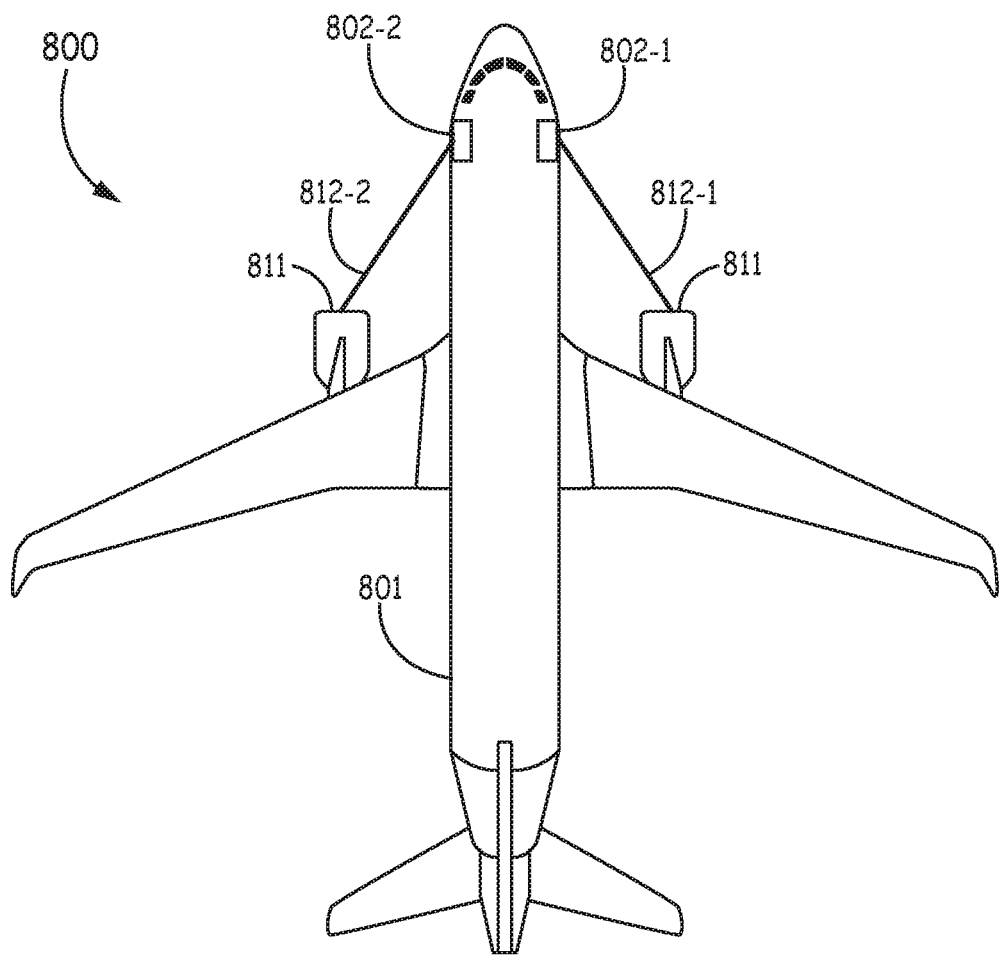
Figure 9A:
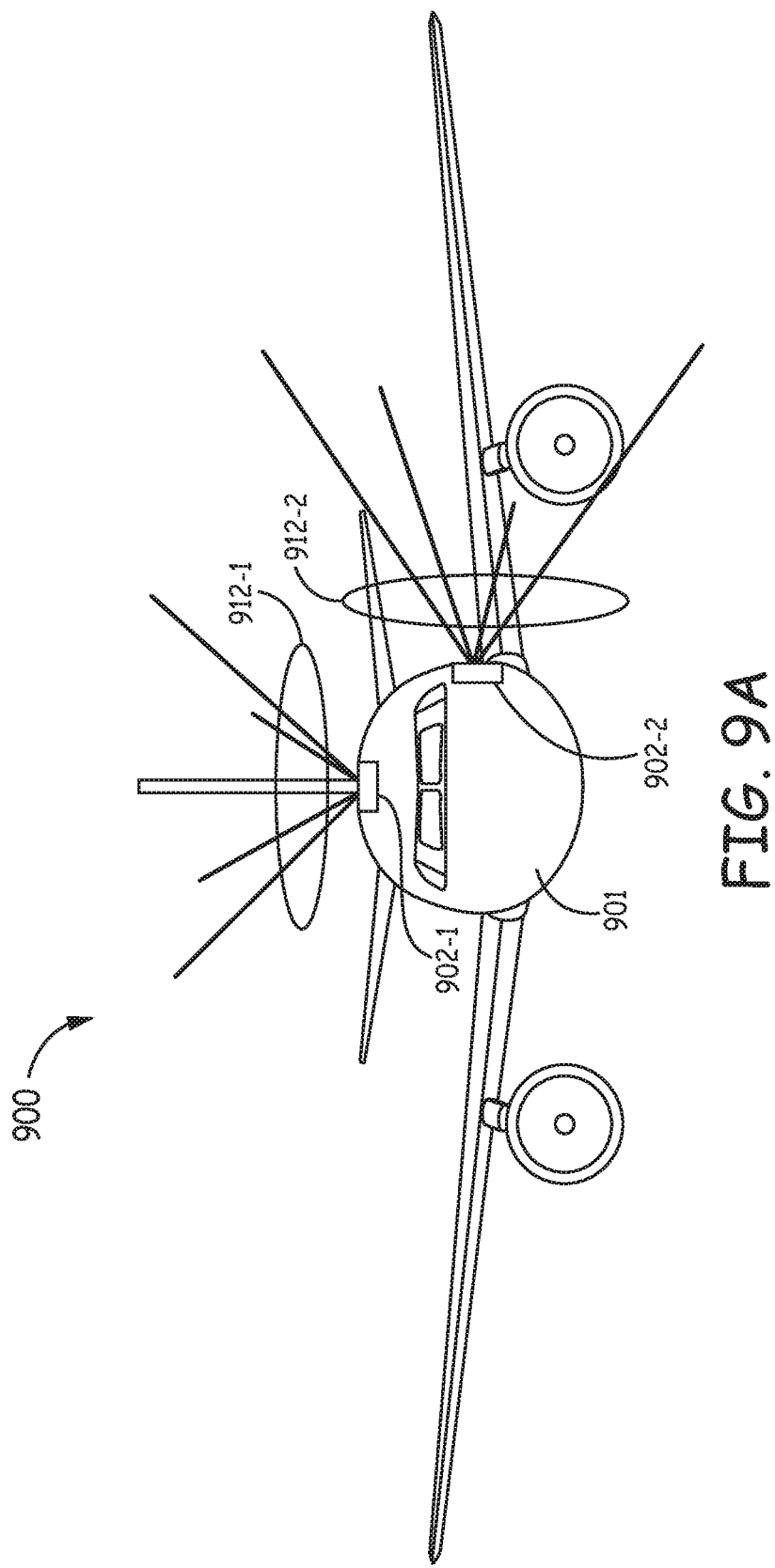
Figure 9B:
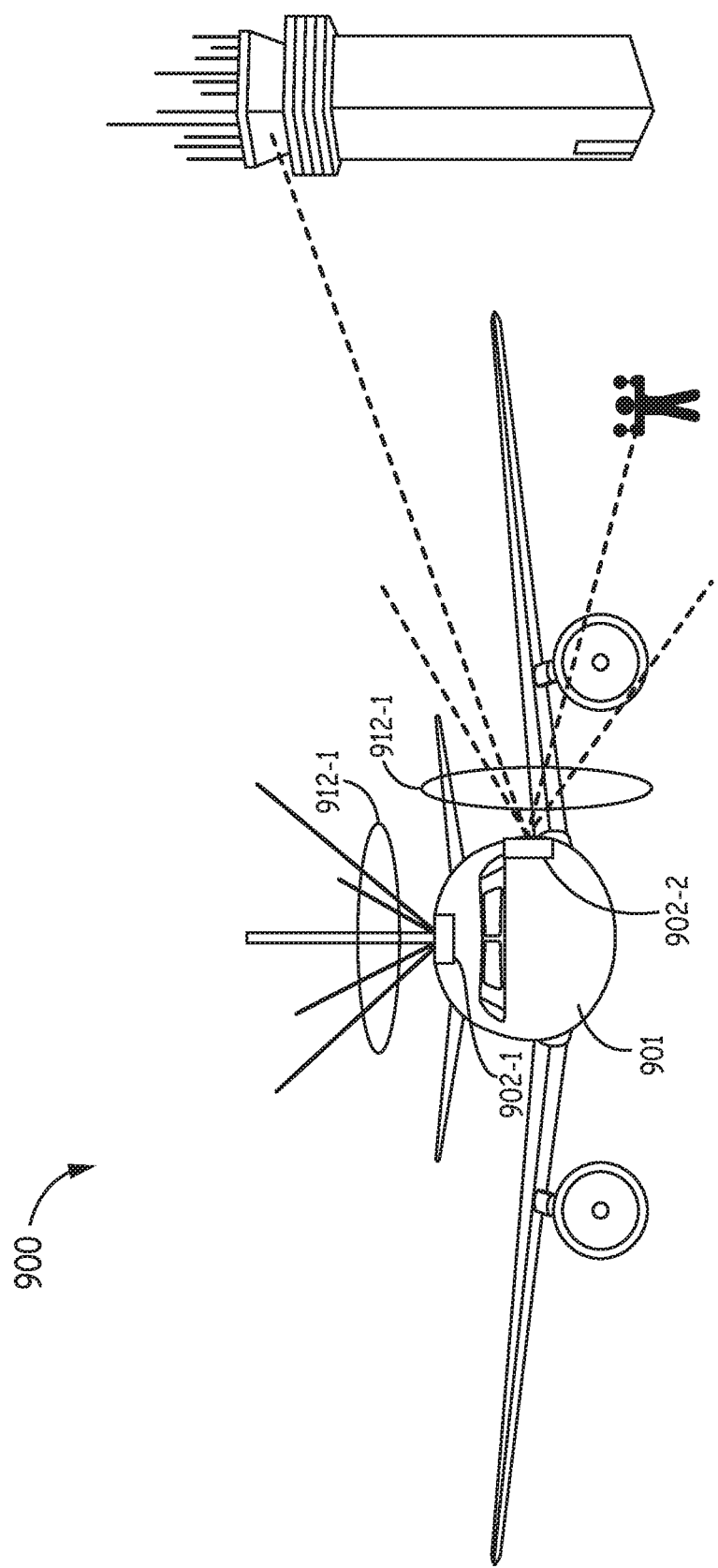
Figure 10:
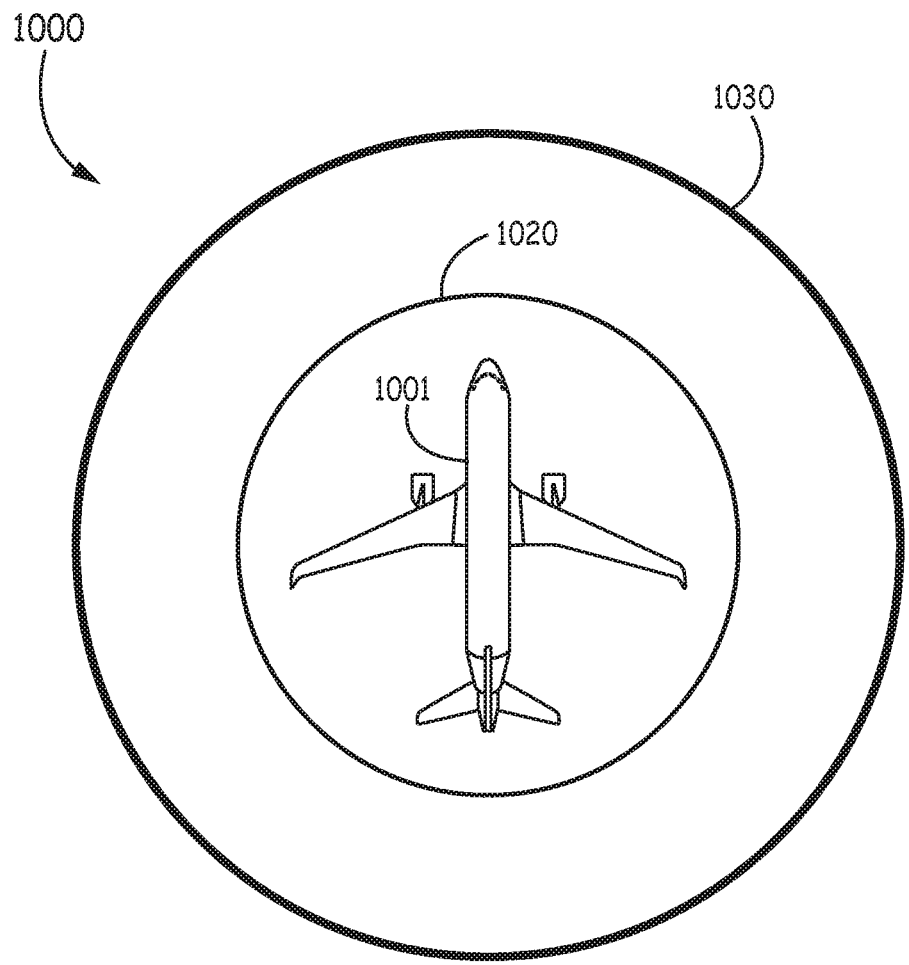

FIG. 3 an exemplary mounting configuration for a laser air data sensor on a vehicle according to one embodiment of the present disclosure;

FIG. 4 illustrates an exemplary mounting configuration for a laser air data sensor on a vehicle according to one embodiment of the present disclosure;

FIG. 5 illustrates exemplary mounting configurations for a laser air data sensor on a vehicle according to one embodiment of the present disclosure;

FIG. 6 illustrates exemplary mounting configurations for a laser air data sensor on a vehicle according to one embodiment of the present disclosure;

FIG. 7 illustrates exemplary mounting configurations for a laser air data sensor on a vehicle according to one embodiment of the present disclosure;

FIG. 8 illustrates exemplary mounting configurations for a laser air data sensor on a vehicle according to one embodiment of the present disclosure;

FIGS. 9A-9B illustrate exemplary methods of operation for a laser air data sensor on a vehicle according to one embodiment of the present disclosure; and FIG. 10 illustrates safety zones for exemplary methods of operations of a laser air data sensor on a vehicle according to one embodiment of the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below include mounting configurations and methods of operation for a laser air data sensor on a vehicle that can be used to address eye safety requirements. In some embodiments, a laser air data sensor is mounted with a particular configuration that reduces the likelihood of eye exposure to optical energies exceeding the prescribed maximum permissible exposure levels. In some embodiments, the laser air data sensor is mounted on the vehicle such that the laser transceiver of the laser air data sensor is fixed transmits one or more laser light beams approximately parallel to a vertical axis of the vehicle. In another embodiment, the laser air data sensor is mounted on the vehicle such that the laser transceiver of the laser air data sensor is fixed and transmits one or more laser light beam toward another part of the vehicle, which acts as a backstop for the one or more laser light beams. In some embodiments, a laser air data sensor is operated in a manner that reduces the likelihood of eye exposure to optical energies exceeding the prescribed maximum permissible exposure levels. In some embodiments, the laser air data sensor is operated such that the one or more laser light beams transmitted by the laser transceiver are attenuated based on one or more operating parameters of the vehicle.

Figure 1:
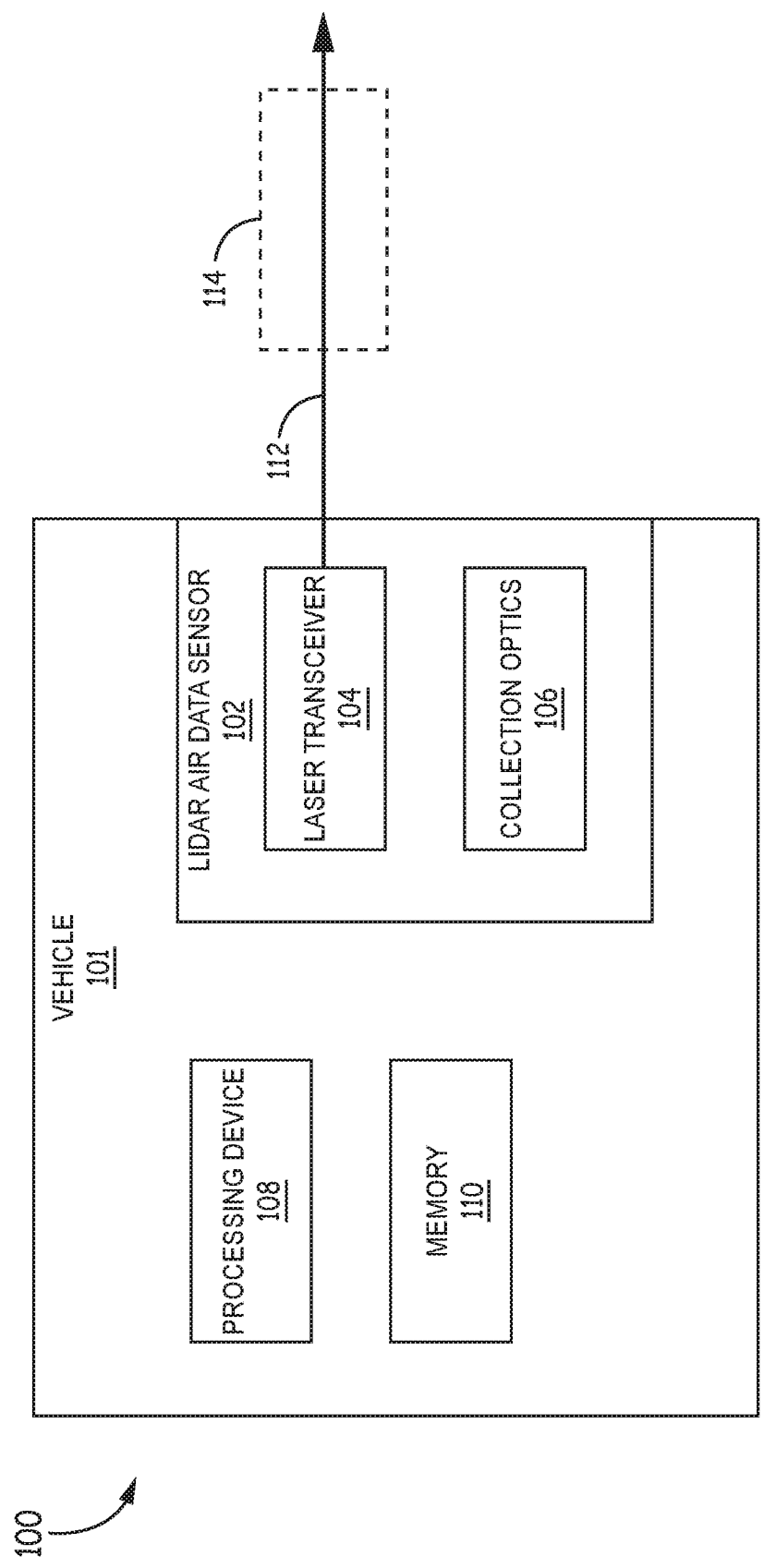
FIG. 1 is a block diagram of an exemplary vehicle that includes a laser based air data sensor according to one embodiment of the present disclosure.

FIG. 1 is a block diagram of an example vehicle 101 that includes a laser based air data sensor, specifically a LIDAR air data sensor 102. It should be noted that in other implementations, element 102 may instead comprise another laser based air data sensor, other than a LIDAR air data sensor, that operates based on receiving backscatter of one or more laser light beams interacting with atoms, molecules, or the like in a volume of air. As such, element 102 is referred to generally herein as laser air data sensor 102. In exemplary embodiments, the vehicle can be an aircraft, a ground based vehicle, a marine vessel, or the like.

The laser air data sensor 102 includes a laser transceiver 104 configured to transmit one or more laser light beams 112. It should be understood that the laser air data sensor 102 can also include more than one laser transceiver 104 if desired. The laser transceiver 104 includes a window that is fixed during operation and directs the one or more laser light beams 112 emitted from the laser transceiver 104. The laser air data sensor 102 also includes collection optics 106 for collecting a reflected portion of the one or more laser light beams 112 due to the backscatter of the one or more laser light beams 112 interacting with atoms, molecules, or the like in a volume of air. In exemplary embodiments, the collection optics 106 include a telescope having one or more lenses and/or one or more mirrors. The field of view of the collection optics 106 is directed to overlap with the propagation of the one or more laser light beams 112.

The laser air data sensor 102 is mounted to an outer surface of the vehicle 101, which is also referred to as the skin of the vehicle 101. In exemplary embodiments, the laser air data sensor 102 is flush mounted with the outer surface of the vehicle 101 so the outer surface of the laser air data sensor 102 is aligned with the outer surface of the vehicle 101. Flush mounting of the laser air data sensor 102 reduces drag caused by the laser air data sensor 102. As will be discussed herein in greater detail with respect to FIGS. 2-10, the laser air data sensor 102 can be mounted to a variety of locations on the vehicle 101 and the laser light beams 112 can be directed in a variety of directions.

The laser air data sensor 102 is generally configured or tuned to measure air that is in a selected measurement region 114 away from the vehicle 101. In particular, the laser air data sensor 102 is controlled to measure a volume of freestream air, which is also referred to as an undisturbed airflow. Further, the laser air data sensor 102 is configured to measure a volume of freestream air near the vehicle, so the information will be useful when calculating air data parameters (e.g., air speed). The laser air data sensor 102 is not configured to measure air that is disturbed by the vehicle 101, which would result in inaccurate measurements for calculating desired air data parameters. For example, the laser air data sensor 102 is not used to measure a volume of air at an engine inlet of an aircraft as this volume of air is disturbed by the engine intake. In exemplary embodiments, the laser air data sensor 102 does not scan the one or more laser light beams 112 during operation like surveying LIDAR used for mapping applications but remains fixed. The measurement region 114 of the laser air data sensor 102 can be controlled by geometrically adjusting the overlap of the field of view of the collection optics 106 with the propagation of the one or more laser light beams 112. In particular, the measurement region 114 can be controlled by adjusting the angle at which the one or more laser light beams 112 are transmitted from the laser transceiver 104 and/or the field of view of the collection optics 106.

In exemplary embodiments, the vehicle 101 also includes at least one processing device 108 coupled to a memory 110 where the at least one processing device 108 is communicatively coupled to the laser air data sensor 102. In exemplary embodiments, the laser air data sensor 102 provides the measurements taken from the measurement region 114 to the at least one processing device 108, which is configured to calculate one or more air data parameters and/or control the operation of the laser air data sensor 102. The at least one processing device 108 can be configured to calculate air speed, angle of attack, angle of sideslip, or other air data parameters known to one having skill in the art. The at least one processing device 108 can also be configured to control the laser air data sensor 102. For example, the at least one processing device 108 can provide control signals to adjust the location of the measurement region 114 of the laser air data sensor 102 by adjusting the laser transceiver 104 or the collection optics 106.

Since the one or more laser light beams 112 transmitted by the laser air data sensor 102 do not attenuate immediately after the measurement region 114, humans can potentially be exposed to optical energies exceeding the prescribed maximum permissible exposure levels if proper eye safety measures are not taken. FIGS. 2-10 below discuss mounting configurations and/or methods of operation for laser air data sensors, such as laser air data sensor 102, which address the concerns regarding eye safety when using laser air data sensors. It should be understood that each of the embodiments of FIGS. 2-10 can be used in conjunction with, or in combination with the embodiments discussed above with respect to FIG. 1. Further, like named features included in FIGS. 1-10 are numbered similarly. For example, a laser air data sensor in FIG. 1 is numbered 102 while a laser air data sensor in FIG. 3 is numbered 302. The functions, structures, and other description of elements for such embodiments described with respect to one figure may apply to like named features included in the other figures and vice versa.

Figure 2:
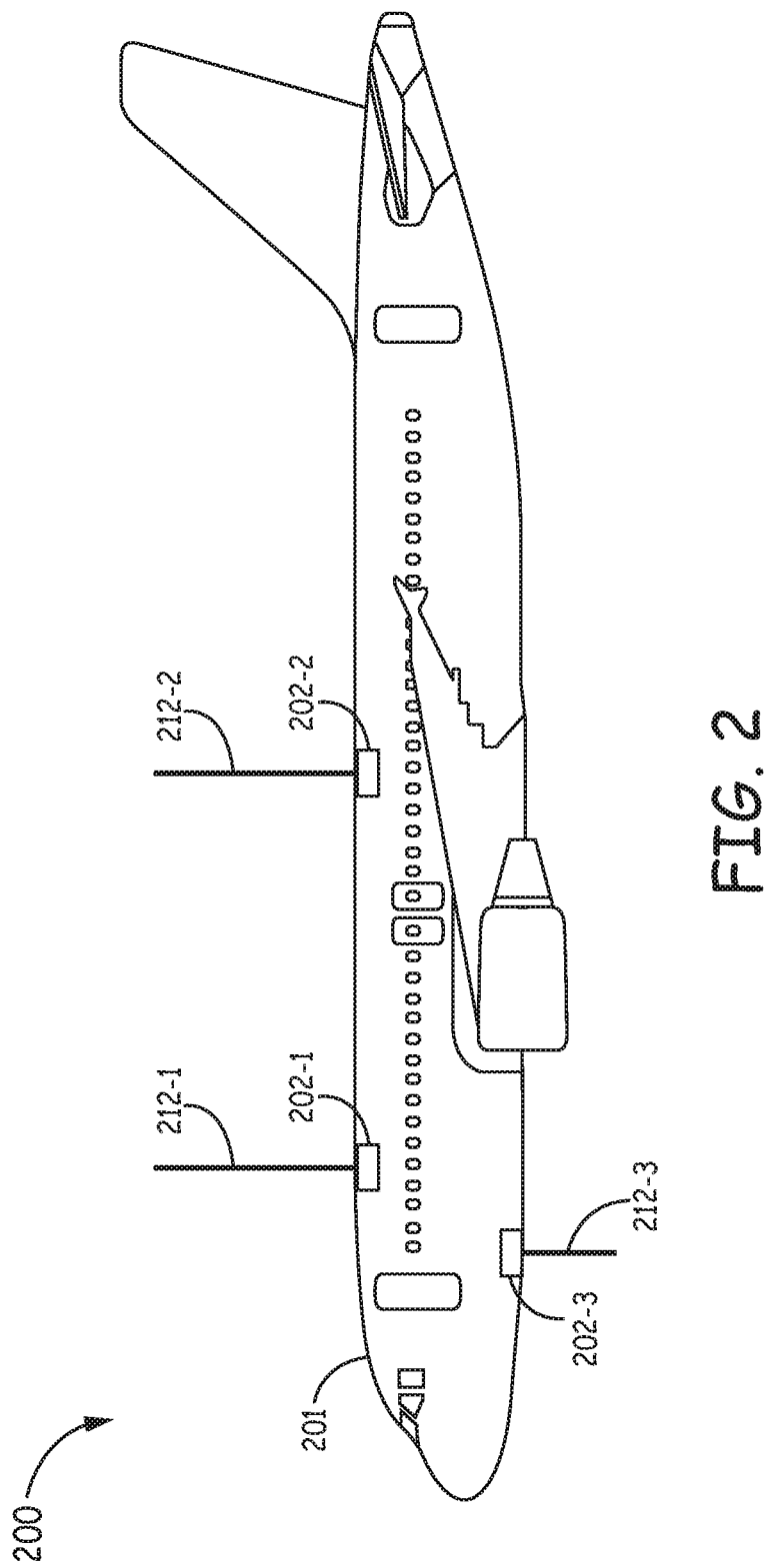
FIG. 2 illustrates exemplary mounting configurations for a laser air data sensor on a vehicle according to one embodiment of the present disclosure.

FIGS. 2-4 illustrate exemplary mounting configurations for a laser air data sensor where the laser transceiver transmits the one or more laser light beams in a direction where humans are unlikely to be located. While FIGS. 2-4 depict an aircraft or components of an aircraft, it should be understood that this is for ease of illustration and that the mounting configurations could also be used for other types of vehicles as well.

FIG. 2 illustrates an example mounting configuration 200 for a laser air data sensor 202 on a vehicle according to one embodiment of the present disclosure. While three laser air data sensors 202-1, 202-2, 202-3 are shown in FIG. 2, it should be understood that one or more laser air data sensors 202 may be included.

In the embodiment shown in FIG. 2, each laser air data sensor 202 is mounted to the vehicle 201 and the window of the laser transceiver of each laser air data sensor 202 is fixed and oriented to transmit the one or more laser light beams 212 approximately parallel to a vertical axis of the vehicle 201. In particular, the laser transceiver window can be oriented to transmit the one or more laser light beams 212 vertically upward or downward from a surface of the vehicle 201. In exemplary embodiments, the laser air data sensors 202 are flush mounted with the outer surface of the vehicle 201 so the outer surface of the laser air data sensor is aligned with the outer surface of the vehicle 201.

When the vehicle 201 is an aircraft, the laser air data sensors 202 can be mounted on the upper or lower portion of the fuselage of the aircraft. In exemplary embodiments, the laser air data sensors 202 are mounted such that the laser transceiver window is positioned within ten degrees from the vertical axis portion of the fuselage on either the top or bottom of the aircraft. The measurement region for the mounting configurations shown in FIG. 2 is configured to be positioned a selected distance from the fuselage of the aircraft. As discussed above, the selected distance will be such that the laser air data sensor will sample freestream air or air that is undisturbed by the aircraft.

FIG. 3 illustrates an example mounting configuration 300 for a laser air data sensor 302 on a vehicle 301 according to one embodiment of the present disclosure. The exemplary embodiment shown in FIG. 3 is similar to the mounting configuration shown in FIG. 2 except that the laser air data sensor 302 transmits four laser light beams 312 approximately parallel to the vertical axis of the aircraft. In exemplary embodiments, the laser light beams 312 are transmitted with a certain geometric relationship to one another such that the combined the measurements taken with each of the four laser light beams 312 are averaged together to produce a more accurate overall calculation of one or more air data parameters compared to those discussed above with respect to FIG. 2. In some embodiments, more than one laser light beam is required to provide measurements in order to calculate a particular air data parameter and a single laser light beam is insufficient to supply enough information to the processing device for calculation.

FIG. 4 illustrates an example mounting configuration 400 for a laser air data sensor 402 on a vehicle 401 according to one embodiment of the present disclosure. The exemplary embodiment shown in FIG. 4 is similar to the mounting configurations 200, 300 shown in FIGS. 2-3 except that the laser air data sensor 402 is mounted to a wing 403 of the aircraft as opposed to the fuselage. In exemplary embodiments, the laser air data sensor 402 is flush mounted with the surface of the wing 403 of the aircraft so the outer surface of the laser air data sensor 402 is aligned with the outer surface of the wing 403 of the aircraft. While the laser air data sensor 402 of FIG. 4 is flush mounted with the top surface of the wing 403 and transmits the laser light beams 412 in an upward direction from the top surface of the wing 403 and approximately parallel to the vertical axis of the aircraft, it should be understood that the laser air data sensor 402 can also be flush mounted with a bottom surface of the wing 403 and configured to transmit the laser light beams 412 in a downward direction from the bottom surface of the wing 403 and approximately parallel to the vertical axis of the aircraft.

In other embodiments, the laser air data sensors discussed above with respect to FIGS. 2-4 could be mounted to another component of the aircraft where the one or more laser light beams can be transmitted upward or downward from a surface of the component of the aircraft and approximately parallel to the vertical axis of the aircraft. In such embodiments, the laser air data sensors can also be flush mounted with an outer surface of the component of the aircraft as discussed above. In some embodiments, the other component of the aircraft includes a horizontal stabilizer of the aircraft.

The example mounting configurations for a laser air data sensor discussed above with respect to FIGS. 2-4 provide eye safety by transmitting the laser light beams away from areas that are likely to be occupied by humans and cause damage from exposure to the laser light beams. In particular, it is unlikely that a human would be positioned directly above a vehicle or directly below a vehicle and within a close enough range that the laser light beams transmitted by a laser air data sensor would cause harm. Further, by positioning a laser air data sensor within ten degrees from the vertical portion of the fuselage in some embodiments, a reasonable amount of flexibility is provided for mounting a laser air data sensor while also limiting the area around the aircraft where the laser light beams can result in exposure to optical energies exceeding the prescribed maximum permissible exposure levels.

FIGS. 5-8 illustrate exemplary mounting configurations for a laser air data sensor where the one or more laser light beams are transmitted toward a portion of the vehicle to provide eye safety. While FIGS. 5-8 depict an aircraft or components of an aircraft, it should be understood that this is for ease of illustration and that similar mounting configurations could also be used for other types of vehicles as well.

FIG. 5 illustrates an example mounting configuration 500 for a laser air data sensor 502 according to one embodiment of the present disclosure. While three laser air data sensors 502-1, 502-2, 502-3 are shown in FIG. 5, it should be understood that one or more laser air data sensors 502 may be included.

In the example embodiment of FIG. 5, laser air data sensor 502-1 is mounted on the fuselage of the aircraft 501 and the window of the laser transceiver is fixed and oriented to transmit the laser light beam 512-1 toward a winglet 505 on the wing 503 of the aircraft 501. In exemplary embodiments, the laser air data sensor 502-1 is flush mounted with a surface of the fuselage of the aircraft 501. In some embodiments, the winglet 505 includes an additional material 515 where the laser light beam 512-1 contacts the surface of the winglet 505. In such embodiments, the additional material 515 may cover a portion of the winglet or the entire winglet. In exemplary embodiments, the additional material 515 comprises a light absorbing material that is non-reflective with respect to a wavelength of the one or more laser light beams 512-1. In exemplary embodiments, the light absorbing material is a non-reflective material that is an opaque material that absorbs at least 50% of the optical energy at the wavelength of the one or more laser light beams 512-1. In other embodiments, the additional material 515 comprises a light reflecting material that is reflective with respect to a wavelength of the one or more laser light beams 512-1. In such embodiments, the additional material 515 is positioned or oriented such that the one or more light beams 512-1 are reflected in a direction that is unlikely to be occupied by humans (for example, parallel to a vertical axis of the aircraft 501). The measurement region 514-1 for the laser air data sensor 502-1 is positioned between the laser air data sensor 502-1 and the winglet 505. The exact location of the measurement region 514-1 can be adjusted to sample a volume of freestream air or air that is undisturbed by the aircraft.

Laser air data sensor 502-2 is mounted on a vertical stabilizer (also referred to as a tailplane) 507 of the aircraft 501. In exemplary embodiments, the laser air data sensor 502-2 is flush mounted with a surface of the vertical stabilizer 507. The window of the laser air data sensor 502-2 is fixed and configured to transmit one or more laser light beams toward the winglet 505 on the wing 503 of the aircraft 501. In exemplary embodiments, if both laser air data sensors 502-1, 502-2 are used in combination, as shown in FIG. 5, then the laser light beams 512-1, 512-2 can be configured to contact the winglet 505 at the same position or at different positions. The measurement region 514-2 for the laser air data sensor 502-2 is positioned between the laser air data sensor 502-2 and the winglet 505 and the exact location of the measurement region 514-2 can be adjusted to sample a volume of freestream air or air that is undisturbed by the aircraft.

Laser air data sensor 502-3 is mounted on the wing 503 of the aircraft 501. In exemplary embodiments, the laser air data sensor 502-3 is flush mounted with a surface of the wing 503. The window of the laser air data sensor 502-3 is fixed and configured to transmit one or more laser light beams 512-3 toward a horizontal stabilizer 509 attached to the vertical stabilizer 507 of the aircraft. In exemplary embodiments, the surface of the horizontal stabilizer 509 includes an additional material, similar to the additional material 515 described above, positioned where the one or more laser light beams 512-3 contact the surface of the horizontal stabilizer 509. The measurement region 514-3 for the laser air data sensor 502-3 is positioned between the laser air data sensor 502-3 and the horizontal stabilizer 509 and the exact location of the measurement region 514-3 can be adjusted to sample a volume of freestream air or air that is undisturbed by the aircraft 501.

In some embodiments, a laser air data sensor 502 may also be mounted to the horizontal stabilizer 509 and the window of the laser transceiver is fixed to transmit the one or more laser light beams toward the wing 503 or winglet 505. In such embodiments, an additional material, similar to the additional material 515 described above, may be positioned where the one or more laser light beams 512 contact the surface of the wing 503 or winglet 505. The measurement region 514 for such a the laser air data sensor 502 would be positioned between the laser air data sensor 502 and the horizontal surface of the wing 503 or winglet 505 and the exact location of the measurement region 514 can be adjusted to sample a volume of freestream air or air that is undisturbed by the aircraft 501.

FIG. 6 illustrates an example mounting configuration 600 for a laser air data sensor 602 according to one embodiment of the present disclosure. While two laser air data sensors 602-1, 602-2 are shown in FIG. 6, it should be understood that one or more laser air data sensors 602 may be included.

In the example embodiment of FIG. 6, laser air data sensor 602-1 is mounted on the winglet of the aircraft and the window of the laser transceiver is fixed to transmit the laser light beams 612-1 toward multiple surfaces of the aircraft 601, which includes the fuselage and a vertical stabilizer of the aircraft. While FIG. 6 shows multiple laser light beams 612-1, it should be understood that the laser air data sensor 602-1 can be configured to transmit one or more laser light beams 612-1. In exemplary embodiments, the laser air data sensor 602-1 is flush mounted with a surface of the winglet of the aircraft. In some embodiments, the surfaces of the fuselage and the vertical stabilizer include an additional material, similar to the additional material 515 described above with respect to FIG. 5, positioned where the one or more laser light beams 612-1 contact the surfaces of the fuselage and the vertical stabilizer. The measurement region for the laser air data sensor 602-1 is positioned between the laser air data sensor 602-1 and the surfaces of the fuselage and the vertical stabilizer and the exact location of the measurement region can be adjusted to sample a volume of freestream air or air that is undisturbed by the aircraft.

Laser air data sensor 602-2 is mounted to the wing of the aircraft. In exemplary embodiments, the laser air data sensor 602-2 is flush mounted with a surface of the wing of the aircraft. The window of the laser air data sensor 602-2 is fixed and configured to transmit one or more laser light beams 612-2 toward the vertical stabilizer of the aircraft. In some embodiments, the surface of the vertical stabilizer includes an additional material similar to the additional material 515 described above with respect to FIG. 5, positioned where the one or more laser light beams 612-2 contact the surface of the vertical stabilizer. The measurement region for the laser air data sensor 602-2 is positioned between the laser air data sensor 602-2 and the vertical stabilizer and the exact location of the measurement region can be adjusted to sample a volume of freestream air or air that is undisturbed by the aircraft.

FIG. 7 illustrates an example mounting configuration 700 for a laser air data sensor 702 according to one embodiment of the present disclosure. In particular, FIG. 7 illustrates a mounting configuration 700 that directs the laser light beams 712 toward the engine inlet 711 of the aircraft 701. While two laser air data sensors 702-1, 702-2 are shown in FIG. 7, it should be understood that one or more laser air data sensors 702 may be included.

In the example embodiment of FIG. 7, laser air data sensor 702-1 is mounted on the wing of the aircraft and the window of the laser transceiver is fixed and configured to transmit one or more laser light beams 712-1 toward the engine inlet 711. In exemplary embodiments, the laser air data sensor 702-1 is flush mounted with a surface of the wing of the aircraft. In some embodiments, the one or more laser light beams 712-1 are transmitted to contact the fans of the aircraft engine. In other embodiments, the one or more laser light beams 712-1 are transmitted to contact a surface within the engine inlet 711. In such embodiments, the surface of the engine inlet 711 can include an additional material similar to the additional material 515 described above with respect to FIG. 5, positioned where the one or more laser light beams 712-1 contact the surface of the engine inlet 711. The measurement region for the laser air data sensor 701-2 is positioned between the laser air data sensor 701-2 and the engine inlet 711 and the exact location of the measurement region can be adjusted to sample a volume of freestream air or air that is undisturbed by the aircraft.

Laser air data sensor 702-2 is mounted to the fuselage of the aircraft 701. In exemplary embodiments, the laser air data sensor 702-2 is flush mounted with a surface of the fuselage of the aircraft 701. The window of the laser air data sensor 702-2 is fixed and configured to transmit one or more laser light beams 712-2 toward the engine inlet 711. In some embodiments, the one or more laser light beams 712-2 are transmitted to contact the fans of the aircraft engine. In other embodiments, the one or more laser light beams 712-2 are transmitted to contact a surface within the engine inlet 711.

In such embodiments, the surface of the engine inlet 711 can include an additional material, similar to the additional material 515 described above with respect to FIG. 5, positioned where the one or more laser light beams 712-1 contact the surface of the engine inlet 711. The measurement region for the laser air data sensor 702-2 is positioned between the laser air data sensor 702-2 and the engine inlet 711 and the exact location of the measurement region can be adjusted to sample a volume of freestream air or air that is undisturbed by the aircraft.

In exemplary embodiments, the laser air data sensors 702 may also be mounted on the winglet of the aircraft 701 or on another component of the aircraft 701 that allows for the window of the laser transceiver to transmit the laser light beams toward the engine inlet of the aircraft. For an aircraft configuration where the engine inlet 811 is positioned below the wings, such as the aircraft 801 shown in FIG. 8, the laser air data sensors 802 may be mounted to fuselage and the window of the laser transceiver configured to transmit the laser light beams 812 toward the engine inlet 811 of the aircraft 801.

The example mounting configurations for a laser air data sensor discussed above with respect to FIGS. 5-8 provide eye safety by transmitting the laser light beams toward another component of the vehicle where the path between the laser air data sensor and the other component of the vehicle is unlikely to be occupied by humans and cause damage from exposure to the laser light beams. Further, since some of the mounting configurations attenuate the laser light beams at the aircraft, the eye safety risk can be limited to the radius of the aircraft rather than the distance it takes for the wavelength of the laser light beams to attenuate in air.

FIGS. 9A-9B illustrate multiple stages of operation for a laser air data sensor. For example, FIG. 9A represents operation of a laser air data sensor on a vehicle during low eye safety risk operating parameters of the vehicle and FIG. 9B represents operation of the laser air data sensor on a vehicle during high eye safety risk operating parameters of the vehicle. While two laser air data sensors 902-1, 902-2 are shown in FIGS. 9A-9B, it should be understood that one or more laser air data sensors 902 may be included. Further, while specific examples of operation are discussed with respect to an aircraft, it should be understood that the methods of operation are similarly applicable to other types of vehicles as well.

A first laser air data sensor 902-1 is mounted to the vehicle 901 and operates in a similar manner to that of laser air data sensor 302-1 described above with respect to FIG. 3. The window of the laser transceiver is fixed and configured to transmit the one or more laser light beams 912-1 approximately parallel to a vertical axis of the vehicle 901. The second laser air data sensor 902-2 is mounted to a side portion of the vehicle 901 and the one or more laser light beams 912-2 are not necessarily blocked or terminated by contacting another portion of the vehicle 901 as described above with respect to FIGS. 5-8.

During low eye safety risk operating parameters for the vehicle, eye safety is not a major concern because humans are unlikely to be exposed to the laser light beams 912-1, 912-2. Accordingly, both laser air data sensors 912-1, 912-2 can generally be operated in a full power mode without increasing the risk of exposure to optical energies that exceed the prescribed maximum permissible exposure levels. However, during high eye safety risk operating parameters for the vehicle, humans in other vehicles, a ground crew, Air Traffic Controllers, or the like may be exposed to the laser light beams 912-2 if operation of the laser air data sensor 912-2 is not modified. Therefore, the laser air data sensor 902-2 is configured to control the laser air data sensor 902-2 to attenuate the laser light beams 912-2 based on one or more operating parameters of the vehicle 901. In exemplary embodiments, the laser air data sensor 902-2 is controlled by a processing device, such as processing device 108, coupled to a memory, such as memory 110. In some embodiments, the processing device controls a shutter (e.g., a mechanical shutter) to block the laser light beams 912-2. In some embodiments, the processing device provides a control signal to the laser air data sensor 902-2 to operate in a low power mode based on one or more operating parameters of the vehicle 901. A lower power mode can include reducing the intensity level of the one or more laser light beams 912-2.

FIG. 10 illustrates example safe zone ranges for operation of a laser air data sensor according to one embodiment of the present disclosure. In particular, the safe zone limit 1030 for full power mode of the laser air data sensor of the aircraft 1001 is farther from the aircraft than the safe zone limit 1020 for low power mode of the laser air data sensor. In exemplary embodiments, the wavelength of the one or more laser light beams during low power mode attenuates in air to an eye safe level at a faster rate than the wavelength of the one or more laser light beams during full power mode.

Referring back to FIGS. 9A-9B, in some embodiments, the one or more operating parameters of the vehicle 901 can include a geographic location of the vehicle 901, where the laser light beams 912-2 are shuttered or the power level of the laser air data sensor 902-2 is reduced to a lower power mode when the vehicle 901 is at selected geographic locations. In exemplary embodiments, the selected geographic locations may include locations at an airport (e.g., the gate or runway) or other areas where there is a high likelihood that humans will be exposed to the laser light beams 912-2. In exemplary embodiments, a list of the selected geographic locations and a range of coordinates for the selected geographic locations is developed and stored in a database on memory 110. The at least one processing device 108 can obtain data from a Global Positioning System (GPS) sensor or the like on the vehicle and compare the data to the information stored in the database. When the at least one processing device 108 determines that the vehicle is located at one of the selected locations, the at least one processing device 108 is configured shutter the one or more laser light beams 912-2 and/or reduce the power level of the laser air data sensor 902-2.

In some embodiments, the one or more operating parameters of the vehicle 901 can include a speed of the vehicle 901, where the one or more laser light beams 912-2 are shuttered and/or the power level of the laser air data sensor 902-2 is reduced to a lower power mode when the speed of the vehicle 901 is below a selected threshold. In exemplary embodiments, for an aircraft, the threshold speed may be correspond to the speed required for the aircraft to takeoff. In other exemplary embodiments, the threshold speed may be determined based on the intensity of the laser light beam and possible exposure time for an eye when the vehicle is travelling at a certain speed. For example, if a vehicle is travelling at a high rate of speed, the possible exposure time might be short enough where the intensity of the laser light beams 912-2 for laser air data sensor 902-2 is not a concern even during ground operations.

In some embodiments, the one or more operating parameters of the vehicle 901 can include a stage of transportation of the vehicle 901. In exemplary embodiments where the vehicle 901 is an aircraft, the stage of transportation may include taxiing, takeoff, in-flight, landing, and the like. It can be determined what stages of operation correlate to situations where human exposure to the laser light beams is a concern (e.g., taxiing, at the gate, or during landing) and the one or more laser light beams 912-2 can be shuttered and/or the power level of the laser air data sensor 902-2 can be operated in a lower power mode during those stages of operation. During other stages of operation, the one or more laser light beams 912-2 are not shuttered and the laser air data sensor 902-2 can be operated in a full power mode.

In some embodiments, the one or more operating parameters of the vehicle can include a Weight on Wheels logic or other Air/Ground logic, where the laser light beams 912-2 are shuttered and/or the power level of the laser air data sensor is reduced to a lower power mode when it is determined that there is weight on the wheels of the vehicle (e.g., vehicle is on the ground). However, when there is no weight on the wheels of the vehicle (e.g., vehicle is in the air), then the laser light beams 912-2 are not shuttered and the laser air data sensor can be operated in a full power mode.

In exemplary embodiments, the first laser air data sensor 902-1 can also be configured to shutter the laser light beams 912-1 and/or operate in a low power mode based on the one or more operating parameters of the vehicle to further increase eye safety.

The methods of operation for the laser air data sensor discussed above with respect to FIGS. 9A-10 provide eye safety by attenuating the one or more laser light beams, which is some embodiments can include shuttering the laser light beams and/or operating the laser air data sensor in a low power mode. Shuttering the laser removes the risk of eye exposure to the laser light beams while operating the laser air data sensor is low power mode reduces the area for which eye safety is a concern. The techniques for operation of the laser air data sensor discussed above with respect to FIGS. 9A-10 may also be combined with the mounting configurations discussed above with respect to FIGS. 2-8 to improve the eye safety of the laser air data sensor with particular mounting configurations by further reducing the risk of exposure to the laser light beams.

In various alternative embodiments, system elements, method steps, or examples described throughout this disclosure (such as the at least one processing device 108, or sub-parts thereof, for example) may be implemented using one or more computer systems, field programmable gate arrays (FPGAs), or similar devices and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

EXAMPLE EMBODIMENTS

Example 1 includes a system, comprising: a vehicle; and a laser air data sensor mounted to a first portion of the vehicle, wherein the laser air data sensor includes a laser transceiver and collection optics, wherein the laser transceiver is configured to transmit one or more laser light beams, wherein a window of the laser transceiver is fixed and oriented to transmit the one or more laser light beams away from the vehicle and approximately parallel to a vertical axis of the vehicle.

Example 2 includes the system of Example 1, wherein the laser air data sensor comprises a Light Detection and Ranging (LIDAR) air data sensor.

Example 3 includes the system of Example 2, wherein the vehicle comprises an aircraft, wherein the window of the laser transceiver is positioned within ten degrees of the vertical axis of the aircraft and mounted to one of the upper fuselage of the aircraft or the lower fuselage of the aircraft.

Example 4 includes the system of any of Examples 1-3, wherein the vehicle further comprises at least one processing device coupled to a memory, wherein the at least one processing device is configured to control the laser air data sensor to shutter the one or more laser light beams or adjust operation of the laser air data sensor to a low power mode based on one or more operating parameters of the vehicle.

Example 5 includes the system of Example 4, wherein the one or more operating parameters of the vehicle include at least one of: a Weight on Wheels logic; a geographic location of the vehicle; a speed of the vehicle; or a stage of transportation of the vehicle.

Example 6 includes the system of any of Examples 1-5, wherein the laser air data sensor is configured to sample a volume of freestream air in a selected measurement region.

Example 7 includes the system of any of Examples 1-6, wherein the laser air data sensor is flush mounted with an outer surface of the vehicle at the first portion of the vehicle.

Example 8 includes a system, comprising: a vehicle; and a laser air data sensor mounted to a first portion of the vehicle, wherein the laser air data sensor includes a laser transceiver and collection optics, wherein the laser transceiver is configured to transmit one or more laser light beams, wherein a window of the laser transceiver is fixed and oriented to transmit the one or more laser light beams toward a second portion of the vehicle, wherein the laser air data sensor is configured to measure an undisturbed airflow in a selected measurement region, wherein the selected measurement region is positioned between the window of the laser transceiver and the second portion of the vehicle.

Example 9 includes the system of Example 8, wherein the second portion of the vehicle includes a light absorbing material, wherein the light absorbing material is non-reflective with respect to a wavelength of the one or more laser light beams, wherein the window of the laser transceiver is oriented to transmit the one or more laser light beams toward the light absorbing material on the second portion of the vehicle.

Example 10 includes the system of any of Examples 8-9, wherein the vehicle comprises an aircraft, wherein the first portion of the vehicle comprises a fuselage of the aircraft, wherein the second portion of the aircraft comprises a winglet of the aircraft.

Example 11 includes the system of any of Examples 8-10, wherein the vehicle comprises an aircraft, wherein the first portion of the aircraft comprises a wing of the aircraft or a winglet of the aircraft, wherein the second portion of the aircraft comprises a stabilizer of the aircraft or a fuselage of the aircraft.

Example 12 includes system of any of Examples 8-11, wherein the vehicle comprises an aircraft, wherein the first portion of the aircraft comprises a stabilizer of the aircraft, wherein the second portion of the aircraft comprises a wing of the aircraft or a winglet of the aircraft.

Example 13 includes the system of any of Examples 8-12, wherein the vehicle comprises an aircraft, wherein the first portion of the vehicle comprises: a fuselage of the aircraft; a wing of the aircraft; or a winglet of the aircraft; and wherein the second portion of the aircraft is an engine inlet, wherein a measurement region of the laser air data sensor is between the laser transceiver and the engine inlet, wherein the measurement region is a sufficient distance from the engine inlet so air in the measurement region is undisturbed by the engine inlet during operation of the vehicle.

Example 14 includes the system of any of Examples 8-13, wherein the laser air data sensor is flush mounted to a surface of the vehicle at the first portion of the vehicle.

Example 15 includes the system of any of Examples 8-14, wherein the vehicle further comprises at least one processing device coupled to a memory, wherein the at least one processing device is configured to control the laser air data sensor to shutter the one or more laser light beams or adjust operation of the laser air data sensor to a low power mode based on one or more operating parameters of the vehicle, wherein the one or more operating parameters of the vehicle include at least one of: a Weight on Wheels logic; a geographic location of the vehicle; a speed of the vehicle; or a stage of transportation of the vehicle.

Example 16 includes a system, comprising: a vehicle; a laser air data sensor mounted to a first portion of the vehicle, wherein the laser air data sensor includes a laser transceiver and collection optics, wherein the laser transceiver is configured to transmit one or more laser light beams; and at least one processing device coupled to a memory, wherein the at least one processing device is configured to control the laser air data sensor to attenuate the one or more laser light beams based on one or more operating parameters of the vehicle.

Example 17 includes the system of Example 16, wherein the one or more operating parameters of the vehicle include at least one of: a Weight on Wheels logic; a geographic location of the vehicle; a speed of the vehicle; or a stage of transportation of the vehicle.

Example 18 includes the system of any of Examples 16-17, wherein attenuate the one or more laser light beams comprises at least one of: block the one or more laser light beams with a shutter; or adjust operation of the laser air data sensor to a low power mode.

Example 19 includes the system of any of Examples 16-18, wherein a window of the laser transceiver is fixed and oriented to transmit the one or more laser light beams toward a second portion of the vehicle.

Example 20 includes the system of Example 19, wherein the second portion of the vehicle includes a light absorbing material, wherein the light absorbing material is non-reflective with respect to a wavelength of the one or more laser light beams, wherein the window of the laser transceiver is oriented to transmit the one or more laser light beams toward the light absorbing material on the second portion of the vehicle.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system, comprising:
   a vehicle; and
   a laser air data sensor mounted to a first portion of the vehicle, wherein the laser air data sensor includes a laser transceiver and collection optics, wherein the laser transceiver is configured to transmit one or more laser light beams, wherein a window of the laser transceiver is fixed and oriented to transmit the one or more laser light beams toward a second portion of the vehicle, wherein the laser air data sensor is configured to measure an undisturbed airflow in a selected measurement region, wherein the selected measurement region is positioned between the window of the laser transceiver and the second portion of the vehicle.

2. The system of claim 1, wherein the second portion of the vehicle includes a light absorbing material, wherein the light absorbing material is non-reflective with respect to a wavelength of the one or more laser light beams, wherein the window of the laser transceiver is oriented to transmit the one or more laser light beams toward the light absorbing material on the second portion of the vehicle.

3. The system of claim 1, wherein the vehicle comprises an aircraft, wherein the first portion of the vehicle comprises a fuselage of the aircraft, wherein the second portion of the aircraft comprises a winglet of the aircraft.

4. The system of claim 1, wherein the vehicle comprises an aircraft, wherein the first portion of the aircraft comprises a wing of the aircraft or a winglet of the aircraft, wherein the second portion of the aircraft comprises a stabilizer of the aircraft or a fuselage of the aircraft.

5. The system of claim 1, wherein the vehicle comprises an aircraft, wherein the first portion of the aircraft comprises a stabilizer of the aircraft, wherein the second portion of the aircraft comprises a wing of the aircraft or a winglet of the aircraft.

6. The system of claim 1, wherein the vehicle comprises an aircraft, wherein the first portion of the vehicle comprises:
   a fuselage of the aircraft; and
   wherein the second portion of the aircraft is an engine inlet, wherein a measurement region of the laser air data sensor is between the laser transceiver and the engine inlet, wherein the measurement region is a sufficient distance from the engine inlet so air in the measurement region is undisturbed by the engine inlet during operation of the vehicle.

7. The system of claim 1, wherein the laser air data sensor is flush mounted to a surface of the vehicle at the first portion of the vehicle.

8. The system of claim 1, wherein the vehicle further comprises at least one processing device coupled to a memory, wherein the at least one processing device is configured to control the laser air data sensor to attenuate the one or more laser light beams based on one or more operating parameters of the vehicle.

9. A system, comprising:
   a vehicle;
   a laser air data sensor mounted to a first portion of the vehicle, wherein the laser air data sensor includes a laser transceiver and collection optics, wherein the laser transceiver is configured to transmit one or more laser light beams; and at least one processing device coupled to a memory, wherein the at least one processing device is configured to control the laser air data sensor to attenuate the one or more laser light beams based on one or more operating parameters of the vehicle, wherein the one or more operating parameters of the vehicle include at least one of:
- a Weight on Wheels logic,
- a location of the vehicle,
- a speed of the vehicle, or
- a stage of transportation of the vehicle.

10. The system of claim 9, wherein the one or more operating parameters of the vehicle include at least one of:
- a Weight on Wheels logic;
- a location of the vehicle;
or
- a stage of transportation of the vehicle.

11. The system of claim 9, wherein attenuate the one or more laser light beams comprises adjusting operation of the laser air data sensor to a low power mode.

12. The system of claim 9, wherein a window of the laser transceiver is fixed and oriented to transmit the one or more laser light beams toward a second portion of the vehicle.

13. The system of claim 12, wherein the second portion of the vehicle includes a light absorbing material, wherein the light absorbing material is non-reflective with respect to a wavelength of the one or more laser light beams, wherein the window of the laser transceiver is oriented to transmit the one or more laser light beams toward the light absorbing material on the second portion of the vehicle.

14. The system of claim 9, wherein the laser air data sensor comprises a Light Detection and Ranging (LIDAR) air data sensor.

15. The system of claim 9, wherein the laser air data sensor is configured to sample a volume of freestream air in a selected measurement region.

16. The system of claim 9, wherein the laser air data sensor is flush mounted to a surface of the vehicle at the first portion of the vehicle.

17. The system of claim 1, wherein the laser air data sensor comprises a Light Detection and Ranging (LIDAR) air data sensor.

18. The system of claim 1, wherein the laser air data sensor is configured to sample a volume of freestream air in a selected measurement region.

19. The system of claim 8, wherein the one or more operating parameters of the vehicle include at least one of:
- a Weight on Wheels logic;
- a geographic location of the vehicle;
- a speed of the vehicle; or
- a stage of transportation of the vehicle.

* * * * *